(12) United States Patent
Ishiyama

(10) Patent No.: US 7,839,423 B2
(45) Date of Patent: Nov. 23, 2010

(54) IMAGE DISPLAY SYSTEM WITH GAZE DIRECTED ZOOMING

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 345 days.

(21) Appl. No.: 11/570,863

(22) PCT Filed: Jun. 8, 2005

(86) PCT No.: PCT/JP2005/010463

§ 371 (c)(1), (2), (4) Date: Jan. 8, 2007

(87) PCT Pub. No.: WO2005/124735

PCT Pub. Date: Dec. 29, 2005

(65) Prior Publication Data

US 2008/0036790 A1     Feb. 14, 2008

(30) Foreign Application Priority Data

Jun. 18, 2004     (JP)     ............... 2004-180485

(51) Int. Cl.
*G09G 5/00*     (2006.01)
*H04N 5/262*     (2006.01)
(52) U.S. Cl. ................... 345/660; 348/240.99
(58) Field of Classification Search .......... 345/619, 345/660; 348/63, 240.99; 715/865
See application file for complete search history.

(56) References Cited

U.S. PATENT DOCUMENTS

| | | | | | |
|---|---|---|---|---|---|
| 5,731,805 | A * | 3/1998 | Tognazzini et al. | ......... | 345/156 |
| 5,850,352 | A * | 12/1998 | Moezzi et al. | ............. | 345/419 |
| 5,912,721 | A * | 6/1999 | Yamaguchi et al. | ......... | 351/210 |
| 6,111,580 | A * | 8/2000 | Kazama et al. | ............. | 715/863 |
| 6,292,713 | B1 * | 9/2001 | Jouppi et al. | ................ | 700/245 |
| 6,593,960 | B1 * | 7/2003 | Sugimoto et al. | ........... | 348/148 |
| 7,561,143 | B1 * | 7/2009 | Milekic | ...................... | 345/156 |
| 2003/0184561 | A1 * | 10/2003 | Vorst | .......................... | 345/619 |
| 2005/0047629 | A1 * | 3/2005 | Farrell et al. | ................. | 382/117 |

FOREIGN PATENT DOCUMENTS

| | | |
|---|---|---|
| JP | 63-118988 A | 5/1988 |
| JP | 1-252993 A | 10/1989 |
| JP | 3-173000 A | 7/1991 |
| JP | 5-139209 A | 6/1993 |

(Continued)

*Primary Examiner*—Ryan R Yang
(74) *Attorney, Agent, or Firm*—Sughrue Mion, PLLC

(57) ABSTRACT

An image display system includes an image display device; an image creating device which creates display image data of a display image displayed in the image display device; a face image pickup device which picks up a face image of a person to look at the display image; and a face front point detecting device which creates face image data from the face image, and detects a face front point as a point positioned in front of a face of the person on the display image on the basis of the face image data. Here, the display image data are data such that the display image has a plurality of regions. The image creating device specifies a specific region corresponding to the face front point from the plurality of regions, and creates the display image data by increasing an amount of information provided from an image corresponding to the specific region.

33 Claims, 9 Drawing Sheets

FOREIGN PATENT DOCUMENTS

| | | |
|---|---|---|
| JP | 8-116556 A | 5/1996 |
| JP | 8-322796 A | 12/1996 |
| JP | 9-251342 A | 9/1997 |
| JP | 9-304814 A | 11/1997 |
| JP | 9-305156 A | 11/1997 |
| JP | 10-78845 A | 3/1998 |
| JP | 2000-59665 A | 2/2000 |
| JP | 2000-347692 A | 2/2000 |
| JP | 2001-55100 A | 2/2001 |
| JP | 3272906 B2 | 1/2002 |
| JP | 2003-240560 A | 8/2003 |
| JP | 2005-136561 A | 5/2005 |

* cited by examiner

IMAGE DISPLAY SYSTEM WITH GAZE DIRECTED ZOOMING

This application claims priority from PCT Application No. PCT/JP2005/010463 filed Jun. 8, 2005, and from Japanese Patent Application No. 2004-180485, filed Jun. 18, 2004, which applications are incorporated herein by reference.

TECHNICAL FIELD

The present invention relates to an image display system, an image display method and an image display program, particularly an image display system, an image display method and an image display program, which are used for monitoring.

BACKGROUND ART

Human visibility is limited and it is impossible for a single person to visually capture the entire directions in a short period of time. If a person is required to visually capture a range beyond the human visibility (hereinafter referred to as a wide range), a special monitoring system is required. As a technique used for this special system, there is known a technique to pick up (photograph) an image as an object to be monitored using an image pickup device for wide range picking-up (referred to as a wide range image pickup device) so as to enable a wide range observation by an image (hereinafter referred to as a wide range image) in which the picked-up image was processed to fit in the visibility.

As a wide range image pickup device, there is an image pickup device capable of picking up an image in a wide range with a single device such as a panorama camera. There is another wide range image pickup device in which images picked up by a plurality of image pickup devices are combined to provide a wide range image. An observer sees the wide range image displayed in a display device so that a range beyond the visibility can be visually captured.

In the case of displaying a wide range image with a sufficient image size and resolution, a screen size required for displaying the image is increased in a display device. Therefore, a large-sized display device capable of displaying the wide range image is required to monitor an object to be monitored using the wide range image.

If it is difficult to provide a large-sized display device, there is a technique to display the wide range image in a small-sized display device by decreasing the image size (reducing resolution). A technique is known to achieve the wide range observation even in a smaller sized system by using a reduced image for monitoring. This technique enables the reduction of costs used for constructing a system. In addition, construction of a system to monitor a wide range in a limited space can be achieved.

If a wide area image is displayed after being reduced, there is a case that information required for monitoring is difficult to obtain from the reduced image (hereinafter referred to as a reduced display image). In this case, there is known a technique in which a desired amount of information can be obtained by increasing the resolution and enlarging the display in a specified region (hereinafter referred to as a specific region) of the reduced display image.

The technique described above is disclosed, for example, as a visual information providing device in Japanese Laid Open Patent Application JP-A-Heisei 5-139209. This visual information supplying device includes a first generating means, a first display means, a second generating means, a second display means, a presenting means, a switch signal generating means, and an image control device. The first generating means generates first visual information. The first display means displays the first visual information as a first image. The second generating means generates second visual information composed of information for the right eye and information for the left eye. The second display means displays the second visual information as a three-dimensional second image. The presenting means is capable of presenting the first and second images independently or by superposing. The switch signal generating means outputs a switch signal to select an image presented in the presenting means. The image control device controls the presenting means on the basis of the switch signal.

In order to realize an enlarged display, the specific region described above needs to be selected. Selection of the specific region has been generally made by operating a changeover switch externally provided for the display device. In a system which does not have the external changeover switch, a specific point on the screen seen by an observer (hereinafter referred to as a visual point) is detected so that a region corresponding to the visual point is made to be a specific region. In the JP-A-Heisei 5-139209, two of a high resolution display device and a low resolution display device are superposed for being used as described above. The sight line direction of the observer is detected so that an image in a region of the sight line direction is displayed in the high resolution display device while displaying a region in the vicinity thereof in the low resolution display device.

In the above described system to detect the sight line direction, an eyeball direction (sight line) detecting sensor for detecting the sight line of the observer is required. The sight line detecting sensor is, for example, mounted on the head of the observer, in which the inclination of the head is detected in response to the movement so as to specify the visual point from the inclination. In another example, the visual point is specified in response to the movement of the eyeballs by mounting the sight line detecting sensor to the observer in such a manner to wear glasses. A technique using the latter method is described in, for example, Japanese Laid Open Patent Application JP-A-Heisei 9-305156.

The JP-A-Heisei 9-305156 discloses a video display method and device. This video display method is a video display method to create and display accurate video at a high speed. It is characterized in that video is created with a normal accuracy in whole video to be displayed, the sight line is continuously detected by using an eyeball direction detecting means, a position on the video corresponding to the center of the visibility is calculated in each moment, video near the center of the visibility is created on the basis of the calculation result by using at least one selected from a high resolution with increased display pixels and a high reproduction with increased colors and gradations.

In the technique described in the JP-A-Heisei 5-139209, a high resolution image is created exclusively for a region in the sight line direction obtained from the eyeball direction detection in order to accelerate the image display. In the techniques described in the JP-A-Heisei 5-139209 and the JP-A-Heisei 9-305156, the sight line direction of the observer is automatically detected by the eyeball movement estimating means, so that a region in the sight line direction is displayed in the high resolution. Therefore, a part required by the observer is automatically displayed in the high resolution without conducting a switch operation.

There is a demand for a technique to appropriately present a wide range image exceeding the visibility of the observer and multiple visual point images within the visibility of the observer. A technique is also demanded to appropriately present a wide range image exceeding the visibility of the observer and multiple visual point images within the visibility of the observer without a special device for detecting the movement of the eyeballs to be mounted to the observer.

As related techniques, an image pickup device is disclosed in Japanese Laid Open Patent Application 2000-59665A. This image pickup device is composed of three image pickup units in which two of the image pickup units are provided on both left and right sides of the one image pickup unit. In the image pickup device, the optical axes have a relationship, in which each of optical axes of the image pickup unit on the left side and the image pickup unit on the right side intersects with an optical axis of the center image pickup unit in the same angle, and these intersecting points of the optical axes are the same point. The three image pickup units are positioned in the same interval in the distance from the each of the intersecting points of the optical axes to the front principal point of each of the image pickup units, in the directions close to an object side from the intersecting points of the optical axes.

An image processing method and device is disclosed in Japanese Laid Open Patent Application JP-A-Heisei 8-116556. This image processing method is characterized in that it includes a multiple visual point image input step for inputting images obtained from a plurality of visual point positions arranged on a plurality of different straight lines, a visual point detecting step for detecting a position of eyes of an observer seeing the images and a direction to be seen, an image reconstruction step for reconstructing an image to be seen from the visual point position detected in the view point detecting step from multiple visual point images data, and an image output step for outputting the reconstructed image via an image output device.

DISCLOSURE OF INVENTION

An object of the present invention is to provide an image display system and an image display method, in which a required amount of information is appropriately presented in a display device using a wide range image exceeding the human visibility and images picked up from multiple visual points.

Another object of the present invention is to provide an image display system and an image display method that do not require a special device for detecting the movement of the eyeballs and the inclination of the head to be mounted to a person, in which a wide range image exceeding the human visibility and images picked up from the multiple visual points are appropriately presented within the human visibility, and a required amount of information can be appropriately extracted from the images.

Yet another object of the present invention is to provide an image display system and an image display method, in which a region consciously required by the person can be stably displayed without being misguided by an unconscious movement of the visual point made by the person to intermittently see a region other than a consciously gazed part.

In order to solve the above problems, the image display system according to the present invention includes an image display device, an image creating device, a face image pickup device, and a face front point detecting device. The image creating device creates display image data of a display image displayed in the image display device. The display image has a plurality of regions. The face image pickup device picks up a face image of a person to look at the display image. The face front point detecting device creates face image data from the face image, and detects a face front point as a point positioned in front of the face of the person on the display image on the basis of the face image data. The image creating device specifies a specific region corresponding to the face front point from the plurality of the regions, and creates the display image data by increasing the amount of information provided from an image corresponding to the specific region.

In the above image display system, the face front point detecting device preferably detects a new face front point. When the new face front point is transited from the specific region, the image creating device preferably creates new display image data by specifying a new region and increasing the amount of information provided from an image corresponding to the new region.

In the above image display system, the image creating device preferably increases the amount of information provided from the image by relatively increasing the display size of the image displayed in the image display device.

In the above image display system, the image creating device preferably increases the amount of information provided from the image by relatively increasing the resolution of the image displayed in the image display device.

In the above image display system, the image creating device preferably composes the display image with a wide range image picked up by a wide range image pickup device which picks up an image in a range exceeding a range of the human visibility. The image display device preferably displays the image data composed of the wide range images to be in a range of the human visibility corresponding to a plurality of regions.

In the above image display system, the image creating device preferably composites a plurality of images picked up by a plurality of image pickup devices as the wide range image pickup device into the display image. The image display device preferably displays the display image data corresponding to the plurality of the regions to be in a range of the human visibility.

In the above image display system, the image creating device preferably includes an information storage unit. The information storage unit stores display device data indicating information on the image display device and face image pickup device data indicating information on the face image pickup device. The face front point detecting device preferably creates face image data by executing three-dimensional image processing on the basis of the face image, and detects a face front point on the basis of the face image data, the display device data and the face image pickup device data.

In order to solve the above problems, the image display method according to the present invention includes (a) creating display image data of a display image displayed in the image display device, wherein the display image has a plurality of regions, (b) picking up a face image of a person looking at the display image, (c) creating face image data from the face image and detecting a point positioned in front of the face of the person on the display image on the basis of the face image data as the face front point of the person, (d) specifying a specific region corresponding to the face front point from the plurality of the regions, and creating display image data by increasing the amount of information provided from an image corresponding to the specific region, and (e) displaying the display image data in the image display device.

It is preferable that the above image display method further includes (f) detecting a new face front point, and (g) creating new display image data by specifying a new specific region and increasing the amount of information provided from an image corresponding to the new specific region when the new face front point is transited from the specific region.

In the above image display method, the increase of the amount of information provided from the image is preferably realized by relatively increasing the display size of the image displayed in the image display device.

In the above image display method, the increase of the amount of information provided from the image is preferably realized by relatively increasing the resolution of the image displayed in the image display device.

In the above image display method, the step (a) preferably includes (a1) composing the display image with a wide range image picked up by a wide range image pickup device for picking up an image in a range exceeding a range of the human visibility. The step (e) preferably includes (e1) displaying the display image data composed of the wide range images to be in a range of the human visibility corresponding to the plurality of the regions.

In the above image display method, the (a1) step preferably has (a11) step to composite a plurality of images photographed by a plurality of image pickup devices as the wide range image pickup device into the display image. Each of the plurality of the regions corresponds to each of the plurality of the images. The (e1) step preferably has (e11) step to display the display image data to be in a range of the human visibility corresponding to the plurality of regions.

In the above image display method, the step (c) preferably includes (c1) reading display device data indicating information on the image display device and face image pickup device data indicating information on a face image pickup device which picks up the face image, and (c2) creating face image data by executing three-dimensional image processing on the basis of the face image, and detecting the face front point on the basis of the face image data, the display device data and the face image pickup device data.

In order to solve the above problems, the program according to the present invention is a program which causes a computer to execute a method, the method including (h) creating display image data of a display image displayed in an image display device, wherein the display image includes a plurality of regions, (i) creating face image data from a face image of a person to look at the display image, and detecting a point positioned in front of a face of the person on the display image as a face front point of the person on the basis of the face image data, (j) specifying a specific region corresponding to the face front point from the plurality of regions, and creating display image data by increasing an amount of information provided from an image corresponding to the specific region, and (k) outputting the display image data to the image display device.

It is preferable that the above program further includes (l) detecting a new face front point, and (m) creating new display image data by specifying a new specific region and increasing an amount of information provided from an image corresponding to the new specific region when the new face front point is transited from the specific region.

In the above program, an increase of the amount of information provided from the image is preferably realized by relatively increasing of the display size of the image displayed in the image display device.

In the above program, an increase of the amount of information provided from the image is preferably realized by relatively increasing the resolution of the image displayed in the image display device.

In the above program, the step (h) preferably includes (h1) composing the display image with a wide range image picked up by a wide range image pickup device which picks up an image in a range exceeding a range of a human visibility. The step (k) preferably includes (k1) outputting the display image data to the image display device such that the display image data composed of the wide range images is displayed to be in a range of the human visibility corresponding to the plurality of regions.

In the above program, the (h1) step preferably includes (h11) compositing a plurality of images picked up by a plurality of image pickup devices as the wide range image pickup device into the display image. Each of the plurality of the regions corresponds to each of the plurality of images. The step (k1) preferably includes (k11) outputting the display image data to the image display device such that the display image data is displayed to be in a range of the human visibility corresponding to the plurality of regions.

In the above program, the step (i) preferably includes (i1) reading display device data indicating information on the image display device and face image pickup device data indicating information on a face image pickup device which picks up the face image, and (i2) creating face image data by executing three-dimensional image processing on the basis of the face image, and detecting a face front point on the basis of the face image data, the display device data and the face image pickup device data.

According to the present invention, it is made possible to provide an image display system for appropriately presenting a required amount of information in a display device using a wide range image exceeding the human visibility and images picked up from multiple visual points.

According to the present invention, it is also made possible to appropriately present the wide range image exceeding the human visibility and the images picked up from the multiple visual points within the human visibility without a special device for detecting the movement of the eyeballs and the inclination of the head to be mounted to a person, in which a required amount of information can be appropriately extracted from the images.

BEST MODE FOR CARRYING OUT THE INVENTION

Figure 1:
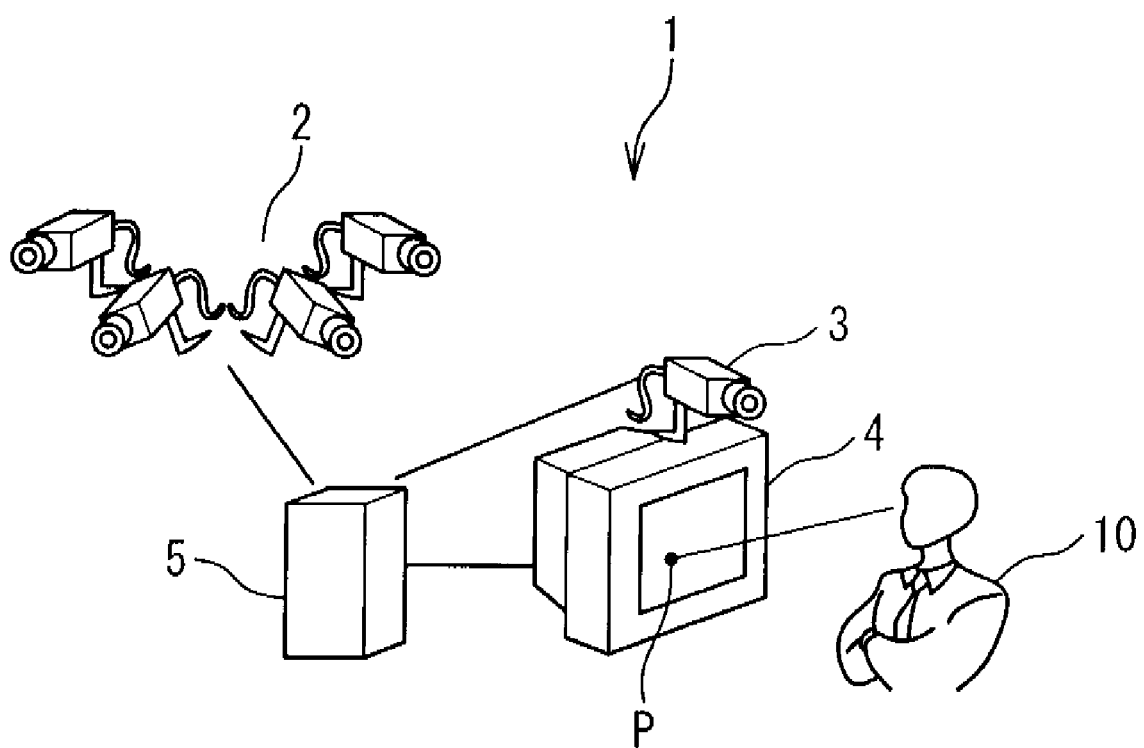
FIG. 1 is a schematic diagram showing the configuration of an image display system according to an embodiment of the present invention.

An embodiment of an image display system according to the present invention will be explained below with reference to drawings. FIG. 1 is a schematic diagram showing a configuration of the image display system according to the embodiment of the present invention. An image display system 1 according to the present embodiment includes a monitoring object image pickup device 2, a face image pickup device 3, an image display device 4, and a computer 5. The monitoring object image pickup device 2 and the computer 5 are electrically connected from each other. The computer 5 receives data outputted from the monitoring object image pickup device 2. The face image pickup device 3 and the computer 5 are electrically connected from each other. The computer 5 receives data outputted from the face image pickup device 3. The image display device 4 is electrically connected to the computer 5. The image display device 4 receives display image data transmitted from the computer 5 to display an image. The monitoring object image pickup device 2, the face image pickup device 3, the image display device 4, and the computer 5 may also be connected via a predetermined network.

An observer 10 observes an image displayed in the image display device 4. A face front point P shown in FIG. 1 indicates a part on a screen of the image display device 4 positioned in front of the face of the observer 10 who is looking at an image displayed in the image display device 4. In the present invention, there is no limitation for the observer 10. That is, according to the present invention, the observer 10 is capable of utilizing the image display system 1 without having detailed knowledge about a technique of the image display system 1.

The monitoring object image pickup device 2 picks up an image in a range which is beyond a range of the human visibility (hereinafter referred to as a wide range). It is exemplified by an optical camera and a CCD camera. The monitoring object image pickup device 2 is composed of a plurality of image pickup devices. Therefore, it is made possible to execute multiple visual points monitoring in which a specific spot is observed from a plurality of spots. An image of an object to be observed, which was picked up by the monitoring object image pickup device 2, is converted to the observation image data and transmitted to the computer 5. The monitoring object image pickup device 2 according to the present invention is not limited to the above configuration. For example, in the case of conducting the wide range observation from a specific spot, the monitoring object image pickup device 2 may be composed of a single image pickup device which is capable of picking up a wide range such as a panorama camera.

The face image pickup device 3 picks up a face image of the observer 10. It is exemplified by the optical camera and the CCD camera. The face image pickup device 3 converts the picked-up face image into the face image data so as to transmit to the computer 5. The face image pickup device 3 is desirably installed in a place in which a relative position thereof can be specified with respect to a position of the face of the observer 10. Alternatively, an installed position of the face image pickup device 3 may be specified by specifying the coordinates of the face image pickup device 3 using a predetermined position of the image display device 4 as the origin.

The computer 5 executes data processing on the basis of the image data (the observation image data and the face image data) to be transmitted from the monitoring object image pickup device 2 and the face image pickup device 3. It is exemplified by a work station and a personal computer. The computer 5 executes a predetermined program in response to the received image data (the observation image data and the face image data), so that the image processing is carried out. The computer 5 outputs display image data created by the image processing to the image display device 4. The image display device 4 displays the display image data transmitted from the computer 5. It is exemplified by a CRT and a liquid crystal display.

Figure 2:
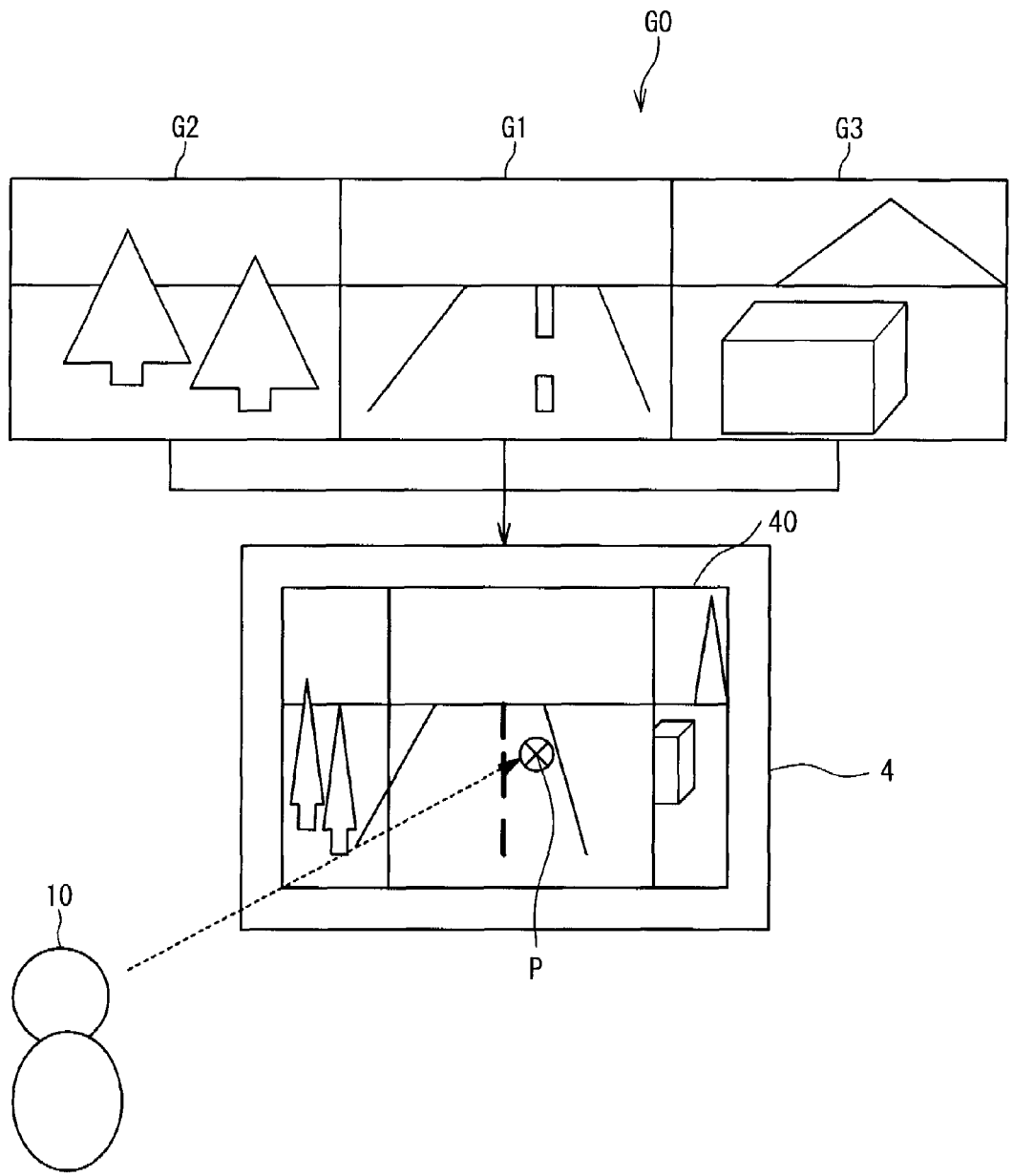
FIG. 2 is a schematic diagram showing an operation of the image display system according to the embodiment of the present invention.

FIG. 2 is a schematic diagram showing an operation of the image display system according to the embodiment of the present invention. It is assumed here that the monitoring object image pickup device 2 picks up an image of an object to be observed by using three of first through third image pickup devices. For example, if each of the image pickup devices substantially has a visual angle of 90 degrees in the horizontal included angle, observation of 270 degrees in the horizontal angle is made possible by the above three image pickup devices.

The monitoring object image pickup device 2 picks up the image of the object to be observed using the three image pickup devices. Then, a plurality of image data is obtained. First image data G1, second image data G2 and third image data G3 as the plurality of the image data show the images picked up by the first through third image pickup devices, respectively. The monitoring object image pickup device 2 transmits the plurality of the picked-up image data to the computer 5.

The computer 5 creates single reference image data G0 on the basis of the plurality of the transmitted image data. Meanwhile, the face image pickup device 3 picks up a face image of the observer 10, and transmits data of the face image to the computer 5. The computer 5 executes a predetermined operation in response to the received face image data, and calculates the face front point P.

The computer 5 creates display image data on the basis of the reference image data G0 and the face front point P for transmitting to the image display device 4. In an example of FIG. 2, the computer 5 determines that the observer 10 pays attention to the first image data G1 from the reference image data G0 and the face front point P. The computer 5 creates display image data so that the first image data G1 can be displayed in the high resolution or by enlarging a display region. At this time, the second image data G2 and the third image data G3 have a low resolution or a narrow display region. The computer 5 transmits the created display image data to the image display device 4. The image display device 4 displays a display image 40 of an enlarged display (high resolution display) of the first image data G1 on the display screen on the basis of the received display image data. The observer 10 is allowed to observe the object to be observed which exists in a range beyond the individual visibility of the observer 10.

Figure 3:
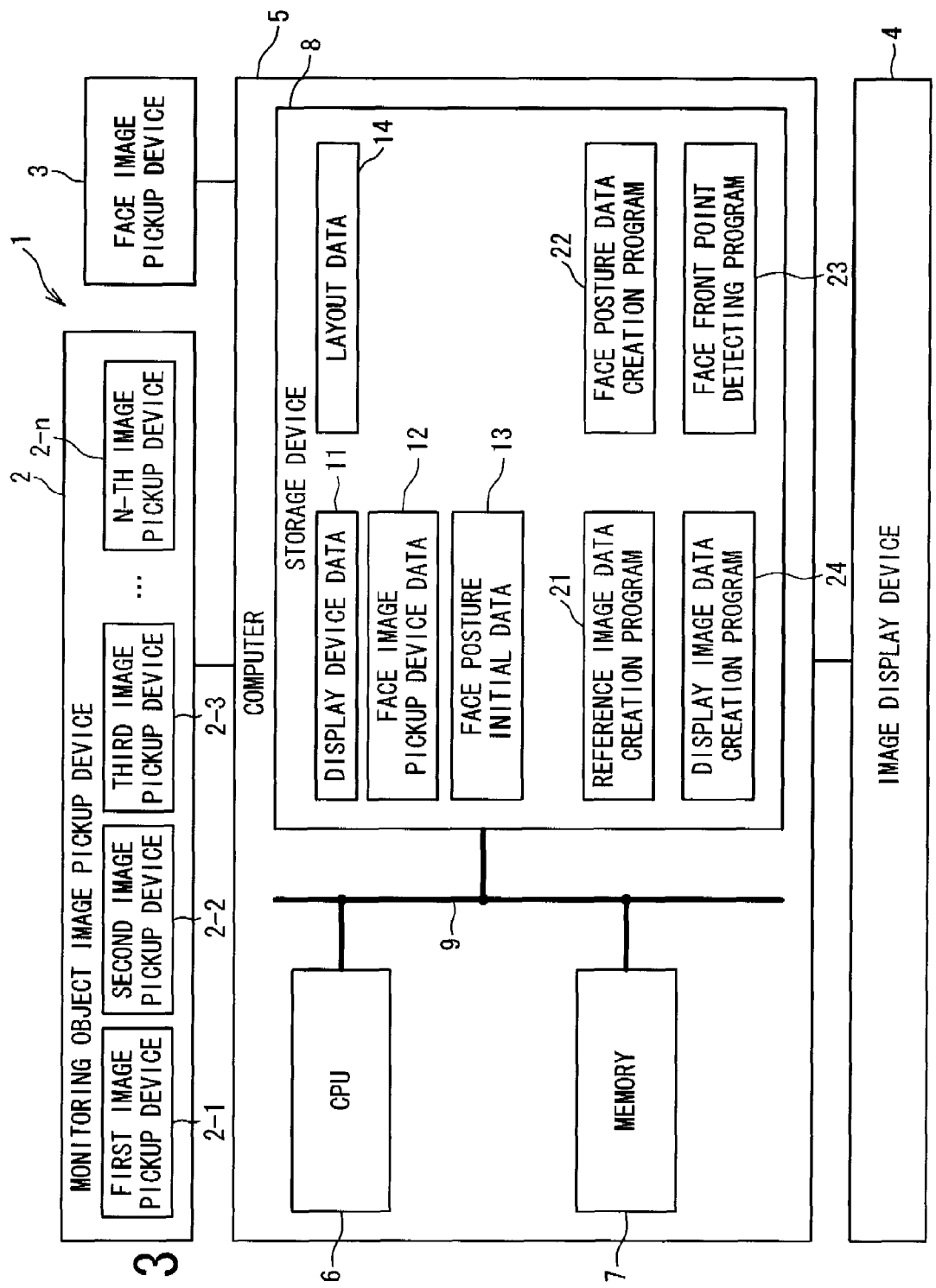
FIG. 3 is a block diagram showing the detailed configuration of the image display system according to the embodiment of the present invention.

More details of the image display system according to the embodiment of the present invention will be explained below. FIG. 3 is a block diagram showing the detailed configuration of the image display system according to the embodiment of the present invention. As described in the explanation of FIG. 1, the image display system 1 according to the present embodiment includes the monitoring object image pickup device 2, the face image pickup device 3, the image display device 4, and the computer 5. In the following explanation, detailed explanation will be omitted for a section similar to the above-described configuration in FIG. 1. The monitoring object image pickup device 2 is composed of the plurality of image pickup devices (2-1 through 2-n). In the monitoring object image pickup device 2, each of the plurality of the image pickup devices (2-1 through 2-n) is installed in an arbitrary position to enable the wide range monitoring and a monitoring from the multiple visual points.

The computer 5 includes a CPU 6, a memory 7 and a storage device 8. The computer 5 may also be connected to a network (not shown). The CPU 6, the memory 7 and the storage device 8 are connected from each other via a bus 9. The CPU 6 is an arithmetic processing device, at least one of which is installed in the computer 5. The CPU 6 gives commands to control devices which are incorporated in the computer 5 or externally installed, and executes arithmetic processing for inputted data to output the result of the arithmetic processing.

The memory 7 is an information storage device provided in the computer 5. The memory 7 is exemplified by a semiconductor storage device such as a RAM. The memory 7 stores predetermined data in response to the command from the CPU 6. The storage device 8 is a large capacity storage device provided in the computer 5. The storage device 8 is exemplified by an HDD and has a nonvolatile storage region. Electronic data (11 through 14) and computer programs (21 through 24) used for the embodiment are stored therein.

The electronic data stored in the storage device 8 include display device data 11, face image pickup device data 12, face posture initial data 13, and layout data 14. Each of the display device data 11, the face image pickup device data 12, the face posture initial data 13, and the layout data 14 is used to execute an operation of the image display system 1.

The display device data 11 is data to indicate information on the image display device 4. The data is exemplified by information such as a display screen size and displayable resolution of the image display device 4 that are required to display an image on the display screen.

The face image pickup device data 12 is data to indicate an installed position of the face image pickup device 3. The data is exemplified by information on an installed position of the face image pickup device 3 which is required for calculating face posture data (data to specify the sight line direction of the observer 10) from the image data picked up by the face image pickup device 3.

The face posture initial data 13 is initial data used for calculating face posture data. The data is exemplified by the face image data in which the observer 10 pays attention to a left corner on the display screen of the image display device 4. The amount of information processing required for calculating the face front point P can be decreased by storing the face posture initial data 13 in advance. A relative distance between the observer 10 and a specific point of the image display device 4 may also be stored as the face posture initial data 13.

The layout data 14 is data related to a display layout in the case of displaying the image to be monitored in the image display device 4. The image of the object to be monitored (wide range image or multiple visual point images) is created by executing the image processing to the image picked up using the monitoring object image pickup device 2 in the computer 5. The computer 5 specifies a region corresponding to the face front point P in the case of displaying the created image to be monitored in the image display device 4. The computer 5 creates display data so that the specified region can be displayed in the high resolution. Accordingly, a display form used in the image display device 4 can be arbitrarily changed by changing the setting of the layout data 14.

The computer programs stored in the storage device 8 include a reference image data creation program 21, a face posture data creation program 22, a face front point detecting program 23, and a display image data creation program 24. Each of the reference image data creation program 21, the face posture data creation program 22, the face front point detecting program 23, and the display image data creation program 24 is used to execute the operation of the image display system 1.

The reference image data creation program 21 creates reference image data (ex. G0 in FIG. 2) to become the reference for creating display image data on the basis of the image data as the object to be monitored (ex. G1 through G3 in FIG. 2) that were transmitted from the monitoring object image pickup device 2. For example, the reference image data creation program 21 creates reference image data corresponding to a seamless image without overlapping if the overlapping exists among the images picked up by the plurality of the image pickup devices (2-1 through 2-n).

The face posture data creation program 22 creates current face posture data of the observer 10 (data to specify the sight line direction of the observer 10) on the basis of the face image data transmitted from the face image pickup device 3, the face posture initial data 13 and the display device data 11.

The face front point detecting program 23 calculates the face front point P on the display screen of the image display device 4 on the basis of the face posture data created in the face posture data creation program 22, the display device data 11 and the face image pickup device data 12.

The display image data creation program 24 creates display image data on the basis of the reference image data created in the reference image data creation program 21, the face front point P calculated in the face front point detecting program 23, and the layout data 14.

In order to obtain an operational effect of the present invention, all of the data and programs described above are not necessarily required. For example, in the case of using the computer 5 with a higher performance, the face posture data creation program 22 may be configured to create the display image data without using the layout data 14. In this case, there is no influence for the operational effect of the present invention.

Figure 4:
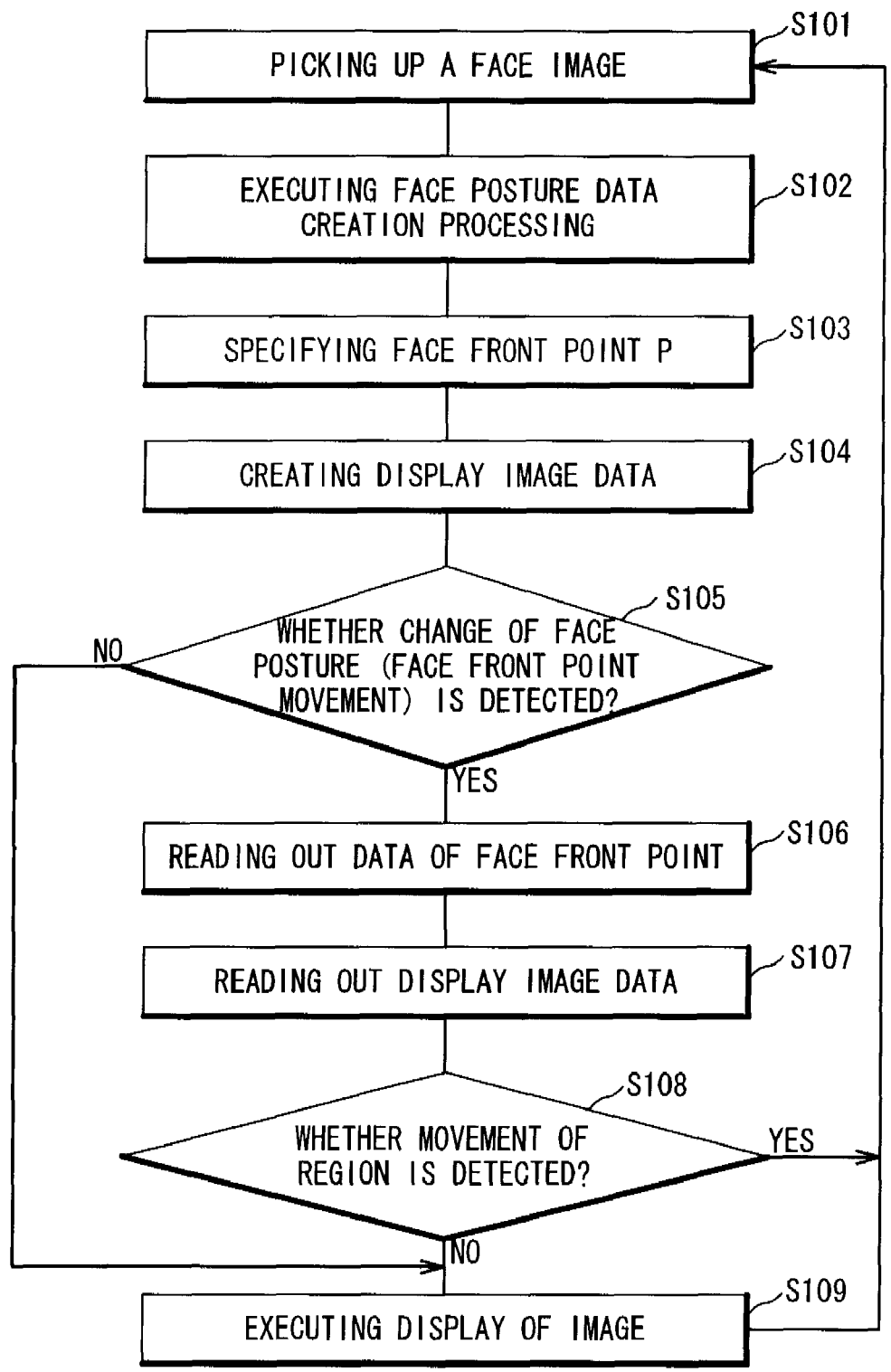
FIG. 4 is a flowchart showing the operation of the image display system according to the embodiment of the present invention.

Next, an operation of the image display system according to the embodiment of the present invention will be explained. FIG. 4 is a flowchart showing the operation of the image display system according to the embodiment of the present invention. In the following operation, explanation will be made on the assumption that required data are stored in the storage device 8 in advance.

The image display system 1 is started so that the image display device 4 displays an image to be monitored. The displayed images are reference image data, which is continuously picked up in a predetermined time interval by the monitoring object image pickup device 2, and to which predetermined image processing was executed by the computer 5. The reference image data is continuously renewed. The observer 10 looks at the displayed images with the naked eye.

In step S101, the face image pickup device 3 picks up a face image of the observer 10. This pickup is executed in a time interval which is short enough to sufficiently detect the movement of the face front point of the observer 10. The face image pickup device 3 converts the picked-up face image into face image data with a data processible form, and transmits it to the computer 5 via a network.

In step S102, the computer 5 starts the face posture data creation program 22 in response to the face image data transmitted from the face image pickup device 3. The CPU 6 in the computer 5 reads out the face posture initial data 13 and the display device data 11 in response to the start of the face posture data creation program 22. Then, on the basis of the face posture initial data 13, the face image data and the display device data 11, current face posture data of the observer 10 is calculated. As an example of a technique to perform the above processing, there is a face posture estimation technique which is available and described in "Face posture estimation with high speed and high accuracy using 3D appearance model" D-12-99 in transaction of general conference of the institute of electronics, information and communication engineers in 2004. A face posture of the observer 10 can be calculated with respect to the face image pickup device 3 by containing the face posture estimation technique in the face posture data creation program 22. Accordingly, the positional relationship between the face image pickup device 3 and the image display device 4 is obtained in advance so that face posture data of the observer 10 with respect to the image display device 4 can be obtained by the operation. The computer 5 moves on to the processing of step S103 in response to completion of calculating the face posture data.

In the step S103, the computer 5 starts the face front point detecting program 23. The CPU 6 in the computer 5 further reads out the face image pickup device data 12 in response to the start of the face front point detecting program 23. Then, on the basis of the face posture data, the display device data 11 and the face image pickup device data 12, the face front point P is specified. The computer 5 moves on to the processing of step S103 in response to completion of specifying the face front point P.

In step S104, the computer 5 starts the display image data creation program 24. The CPU 6 in the computer 5 creates display image data in response to the start of the display image data creation program 24 on the basis of the reference image data picked up by the monitoring object image pickup device 2 and data-processed by the computer 5, the face front point P and the layout data 14. The display image data is created so that the high resolution image can be displayed in a display region (high resolution display region) corresponding to the face front point P. The computer 5 moves on to the processing of step S105 in response to completion of creating the display image data.

In step S105, it is determined whether or not the face front point P was moved during the processing of step S104. For example, a process such as the step S103 is carried out again to determine that there is no movement if the face front point specified in the previous process is the same as the face front point specified in the current process. If movement of the face front point is not detected in the determination result (step S105: NO), the computer 5 transmits the display image data created in the step S104 to the image display device 4 via a network. If movement of the face front point is detected after creating the display image data (step S105: YES), the processing moves on to step S106.

In step S106, the computer 5 reads out data related to the moved face front point P which is detected (calculated in the step S105) (hereinafter referred to as the face front point data). The face front point data is exemplified by the coordinates in the screen of the image display device 4.

In step S107, the computer 5 reads out the display image data (created in the step S104) in response to completion of reading out the face front point data. In response to completion of reading out the face front point data and the display image data, respectively, the processing moves on to step S108.

In step S108, the computer 5 determines whether or not the face front point P corresponds to the high resolution display region of the read display image data. When the face front point P is made correspond to the current display image data, if the determination result indicates that the region to display an image in the high resolution (high resolution display region) does not correspond to the face front point P (step S108: YES), the processing returns to step S101, so that new display image data is created. If the face front point P is moved in step S108 but does not deviate from the region to display an image in the high resolution (step S108: NO), the computer 5 transmits the display image data created in step S104 to the image display device 4 via a network, and the processing moves on to step S109.

In step S109, the image display device 4 receives the display image data transmitted from the computer 5, and displays an image corresponding to the display image data on the display screen. This operation is continued so that the image display system 1 is capable of automatically displaying a region corresponding to a part intended by the observer 10 in the high resolution in accordance with the movement of the face front point of the observer 10.

In the above operation, it is possible to omit the steps S105 through S108. In this case, image display and renewal can be further promptly realized.

Figure 5:
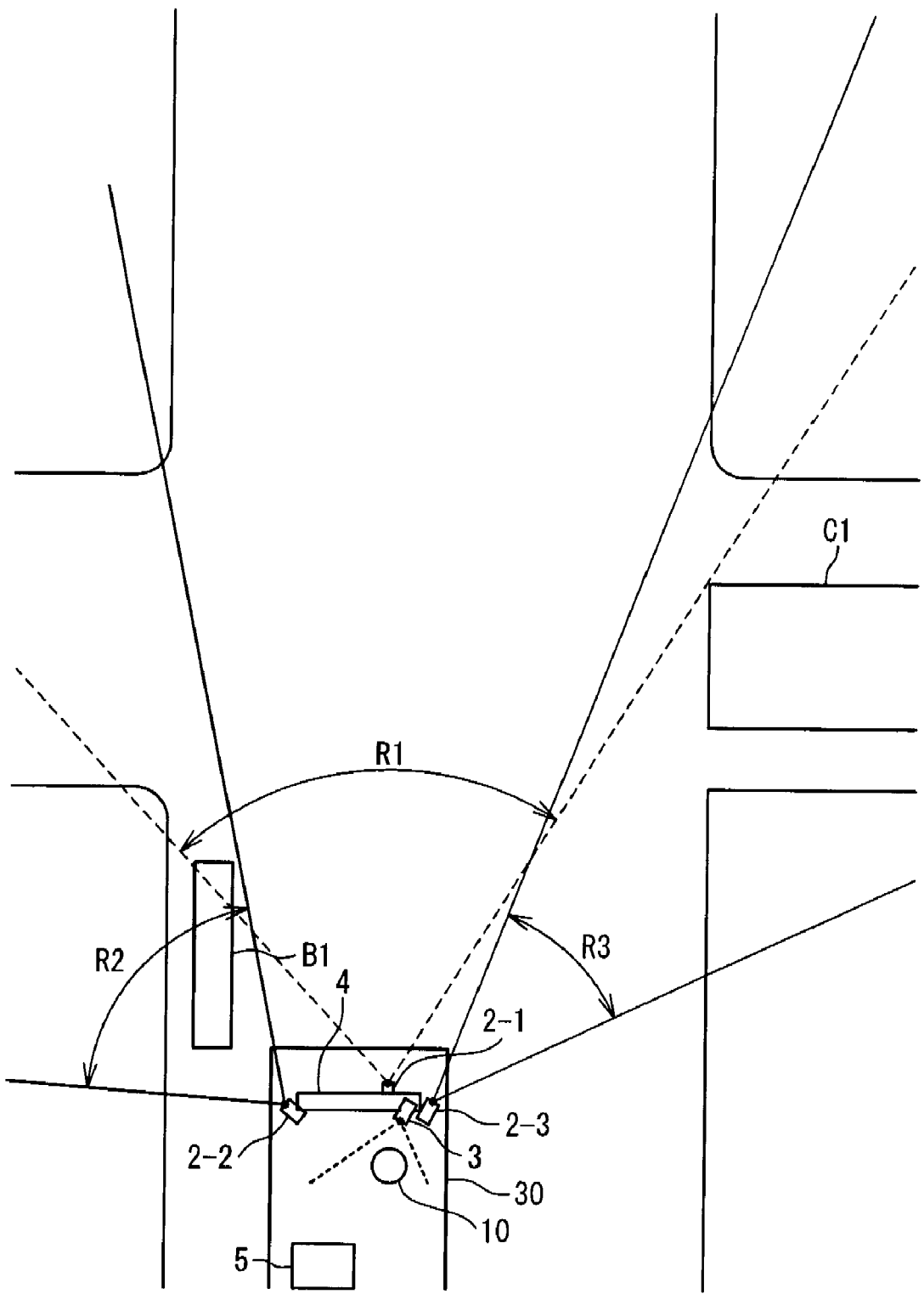
FIG. 5 is a diagram showing a configuration of the image display system applied to an operation of a vehicle.

Next, how to concretely utilize the image display system according to the present invention will be explained. FIG. 5 is a diagram showing a configuration of the image display system 1 applied to an operation of a vehicle. A vehicle 30 is a moving object having the image display system 1. FIG. 5 shows a situation that the vehicle 30 is approaching to an intersection P. Referring to FIG. 5, a two-wheeled vehicle B1 runs in the vicinity of the left front of the vehicle 30 while a car C1 exists on a road in the right front with respect to the traveling direction of the vehicle 30. The vehicle 30 is provided with the monitoring object image pickup devices 2 (2-1 through 2-3), the face image pickup device 3, the image display device 4, and the computer 5. The observer 10 (a driver of the vehicle 30) also drives the vehicle while looking at images displayed in the image display device 4. The first image pickup device 2-1 picks up an external image in a range corresponding to a visibility R1. The second image pickup device 2-2 picks up an external image in a range corresponding to a visibility R2. The third image pickup device 2-3 picks up an external image in a range corresponding to a visibility R3. The face image pickup device 3 is internally installed in the vehicle 30 to constantly pick up a face image of the observer 10.

The first image pickup device 2-1 through the third image pickup device 2-3 convert the picked-up external images into electronic data. The data is then converted into data with an information processible form by the computer 5 so as to be transmitted to the computer 5 via an internal network (not shown) of the vehicle 30. The face image pickup device 3 similarly converts the picked-up face image into electronic data. The data is then converted into data with an information processible form so as to be transmitted to the computer 5 via the network. The computer 5 executes image processing on the basis of the external image data and the face image data that were received so as to create display image data. The created display image data is transmitted to the image display device 4 via the above described network.

Figure 6:
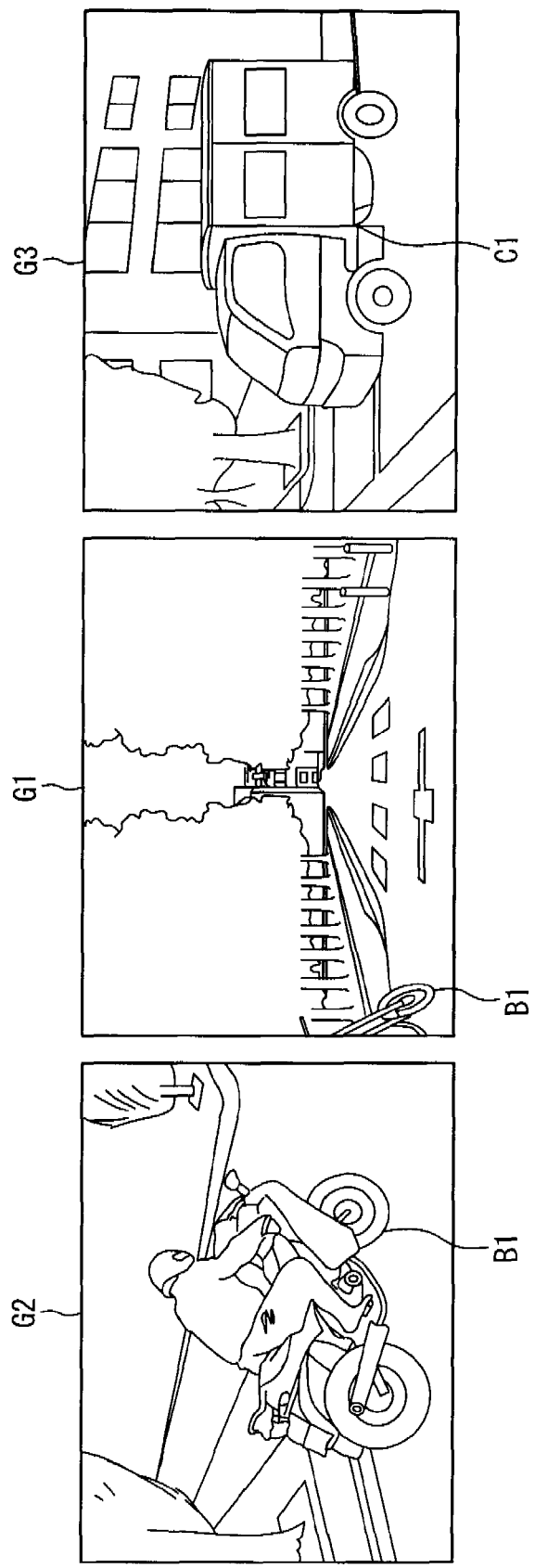
FIG. 6 is a diagram exemplifying external image data picked up by a first image pickup device to a third image pickup device.

FIG. 6 is a diagram exemplifying the external data picked up by the first image pickup device 2-1 through the third image pickup device 2-3. The first image data G1 shows the image data picked up by the first image pickup device 2-1. Similarly, the second image data G2 shows the image data picked up by the second image pickup device 2-2 while the third image data G3 shows the image data picked up by the third image pickup device 2-3.

Figure 7:
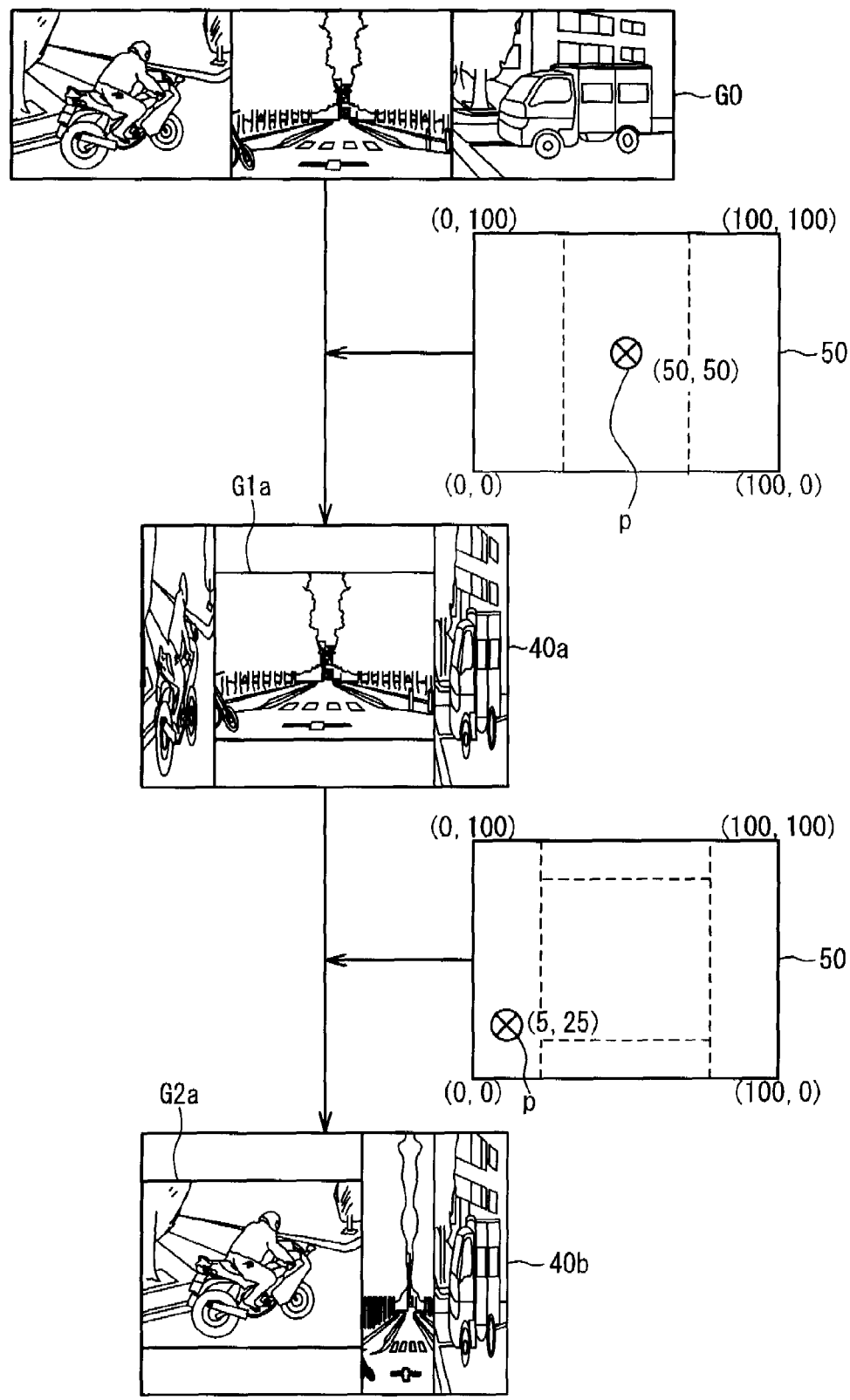
FIG. 7 is a diagram showing an operation of creating display image data from first image data through third image data.

FIG. 7 is a diagram showing an operation of creating display image data 40 (40a and 40b) from the above first image data G1 through the third image data G3. The reference external image data G0 is reference image data created on the basis of the first image data G1 through the third image data G3.

The reference image data G0 shown in FIG. 7 is created by combining the image data (G1 through G3), in which a relative position of each of the image data (the first image data G1 through the third image data G3) is specified. In order to decrease the amount of information of the reference image data G0, the reference image data G0 may also be created by reducing the size of each of the image data (G1 through G3) in the horizontal direction at a predetermined ratio. The created reference image data G0 is displayed in the image display device 4 if the face front point P is not detected. When the system operates to detect the face front point P, face front point data 50 is created. Although the face front point data 50 shows the face front point P corresponding to the reference image data G0 for easily understanding the present invention, the face front point data may also be numerical data indicating the coordinates on the screen for practical use.

If the face front point P of the observer 10 here is located in a position indicated by the coordinates (50, 50) as shown in FIG. 7, the computer 5 calculates a region corresponding to the point indicated by the coordinates. The computer 5 then creates display image data on the basis of the calculated region and the face front point data 50 so that an image G1a corresponding to the above described first image data G1 can be displayed in the high resolution. The created display image data is outputted to the image display device 4 via the network. The image display device 4 displays a display image 40a on the screen on the basis of the display image data provided from the computer 5.

There is a case to be considered in which a position of the face front point P is determined not to exist in a region of the display image G1a due to the movement of the sight line of the observer 10. The computer 5 monitors the movement of the face front point of the observer 10 on the basis of the face image data transmitted from the face image pickup device 3. As shown in FIG. 7, when the coordinates of the face front point P of the face front point data 50 indicate a face front point P (5, 25) (hereinafter a face front point P is referred to as a new face front point P) due to the movement of the sight line of the observer 10, the computer 5 determines that the new face front point P does not exist in a region of the display image G1a.

The computer 5 creates new display image data from the coordinates of the above new face front point P (face front point P (5, 25)) and the display image data outputted to the image display device 4 by corresponding to the determination result, so that an image G2a corresponding to the second image data G2 can be displayed in the high resolution. The newly created display image data is outputted to the image display device 4 via the network. The image display device 4 displays a new display image 40b on the screen on the basis of the new display image data provided from the computer 5.

Accordingly, an image of an intended part is specified simply by the slight movement of the face of the observer 10, so that the observer 10 is capable of looking at an image of the specified region in the high resolution. By the present invention being used for driving a vehicle, the dead angle of images in front, left and right of the observer 10 (driver of the vehicle) can be decreased. For example, the observer 10 is required to confirm the non-involvement of the two-wheel vehicle B1 traveling side by side on the left side when the vehicle 30 is turned left. The observer 10 is generally required to rotate the face to visually observe the two-wheel vehicle B1 on the left side. There is a case of carelessly looking ahead due to the leftward visual observation during traveling, or an accident is occasionally caused by skipping the leftward visual observation. There is also a possibility of overlooking the car C1 coming from the right side while concentrating on the two-wheel vehicle B1 on the left side.

However, according to the present invention, a wide visibility image including the two-wheel vehicle B1 on the left side through the car C1 on the right side is displayed in the image display device 4 which displays entire images in a visually observable range even in the state of facing front. The observer 10 is therefore capable of judging the situation around the intersection promptly and easily. In order to realize precise judgment of the situation and confirm a relative distance to the two-wheel vehicle B1 or the size of the two-wheel vehicle B1, the second image data G2 needs to be displayed in the high resolution. When the observer 10 looking at the display image G1a notices the existence of the two-wheel vehicle B1 displayed in the display image G1a, an image which is equivalent to an image made by visually observing leftward during traveling can be shown by simply moving the face in 20 to 30 degrees (or lower degrees). There is also a less possibility of overlooking the car C1 on the right side due to a constant display thereof in the low resolution, and the existence of the car C1 can be noticed while confirming the two-wheel vehicle B1.

Although the above explanation was made in the case of applying the image display system according to the present invention to a car traveling on a road, a moving object to which the image display system according to the present invention is applied is not limited to a vehicle traveling on the ground. For example, a configuration similar to the above image display system can be provided for a vessel sailing on the water or the like.

Figure 8:
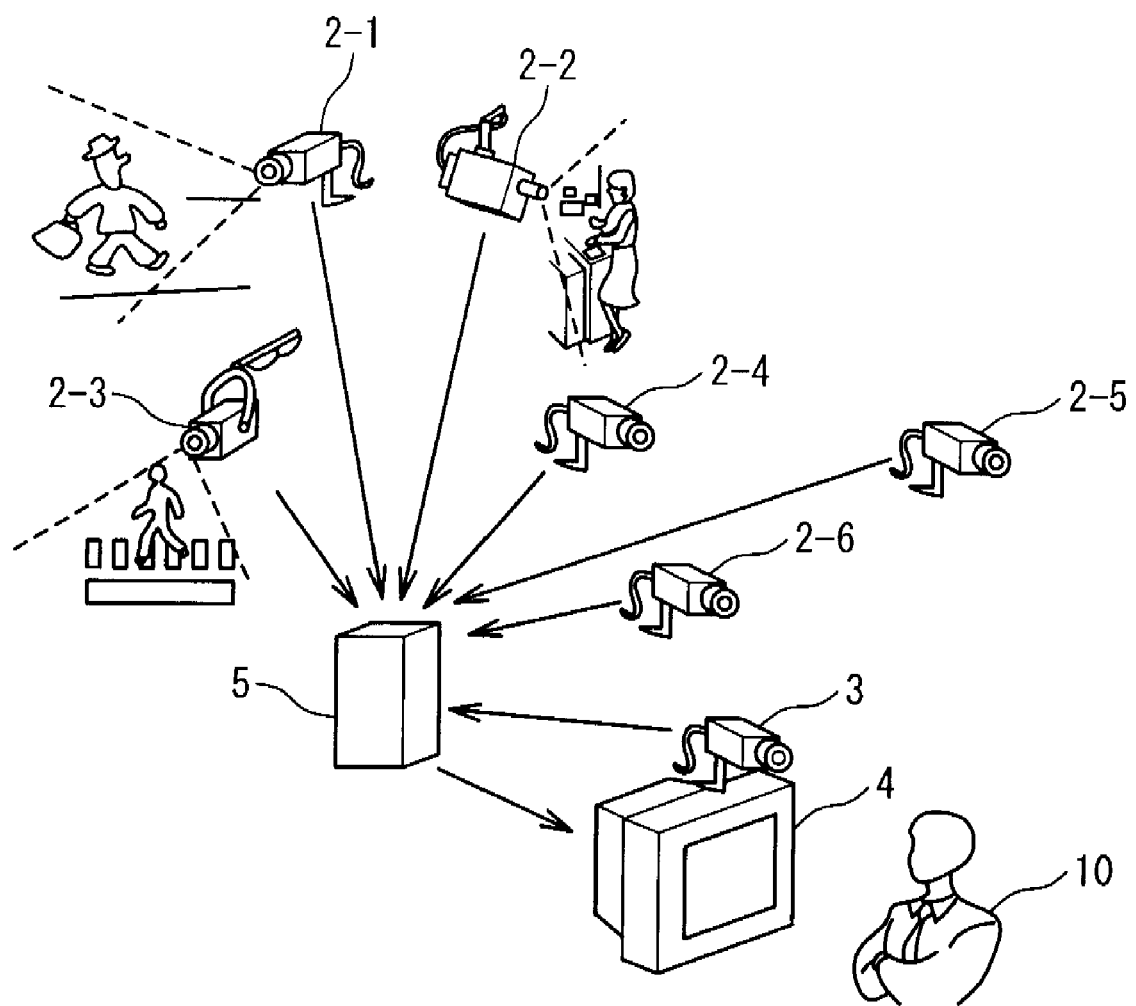
FIG. 8 is a schematic diagram showing a configuration of the embodiment applied to wide area monitoring.

The present invention exhibits an effect in the case of being applied to a wide area monitoring system (a system in which a guard monitors images from monitoring cameras installed in a plurality of different places). FIG. 8 is a schematic diagram showing a configuration of the present embodiment applied to the wide area monitoring. As shown in FIG. 8, the wide area monitoring system is composed of the plurality of the image pickup devices (2-1 through 2-6) for picking up images in different spots, the face image pickup device 3, the image display device 4, and the computer 5. In the following explanation, it is assumed that each of the devices having the same reference letter with the above described device has the same configuration with the above device, so that detailed explanation thereof will be omitted.

As shown in FIG. 8, the plurality of the image pickup devices (2-1 through 2-6) is composed of six monitoring cameras for picking up images in six different places, for example. Each of the image pickup devices is connected to the computer 5 via the network (not shown). The plurality of the image pickup devices (2-1 through 2-6) create image data of predetermined pixels in which an image of a situation in each of the spots is picked up so as to output it to the computer 5 via the network. The face image pickup device 3 and the image display device 4 are also connected to the computer 5 via the network. The observer 10 is a person who observes images displayed in the image display device 4.

The face image pickup device 3 is a face image pickup device to pick up an image of the face of the observer 10. The face image pickup device 3 is connected to the computer 5 and the image display device 4 via the above-described network. The face image of the observer 10 picked up by the face image pickup device 3 is converted to face image data and inputted to the computer 5. The computer 5 detects the face front point P of the observer 10 on the basis of the face image data provided from the face image pickup device 3, and creates face front point data.

Figure 9:
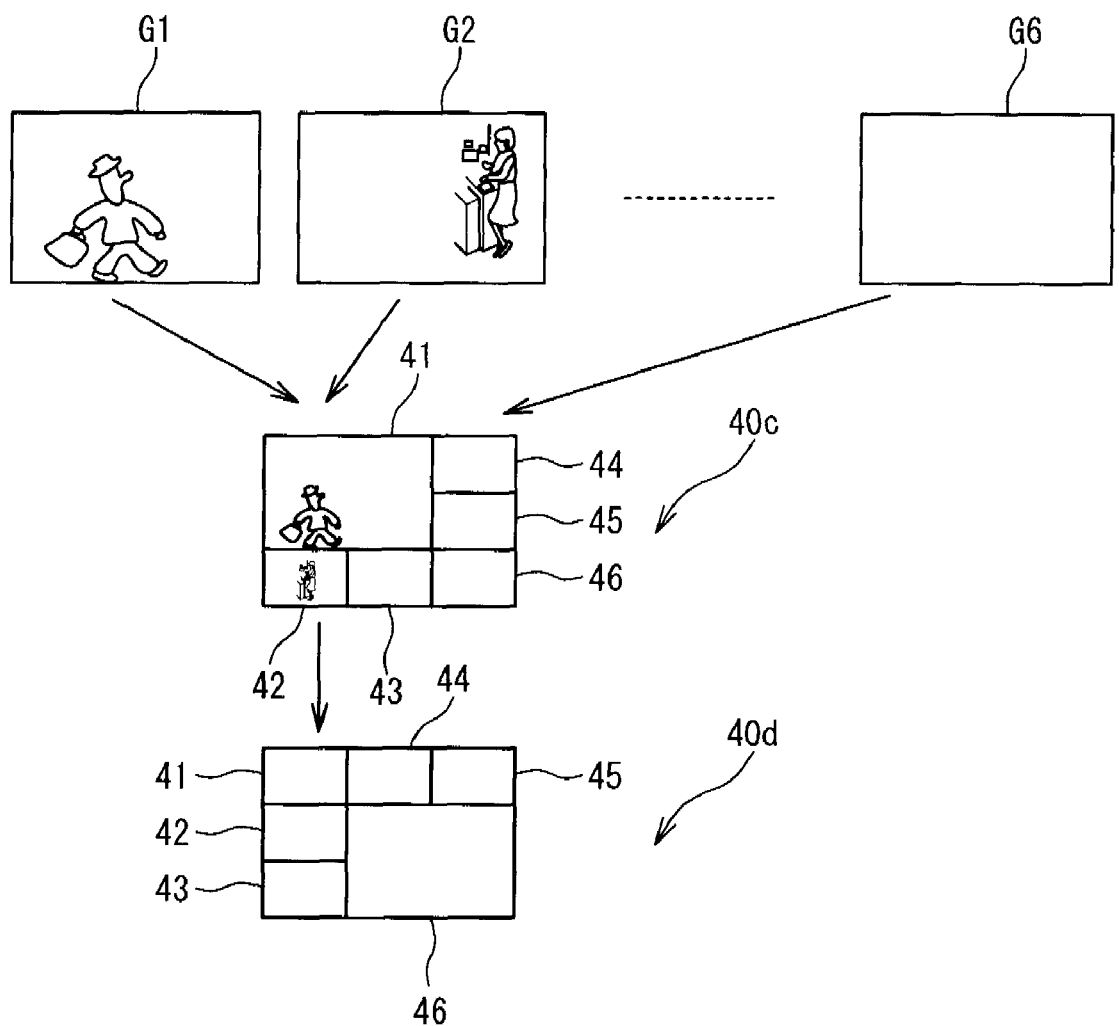
FIG. 9 is a schematic diagram showing an operation of the present invention applied to a wide area monitoring system.

FIG. 9 is a schematic diagram showing an operation of the present invention applied to the wide area monitoring system. The image pickup devices (2-1 through 2-6) respectively installed in the image pickup spots convert the picked-up image into electronic data for transmitting to the computer 5. The computer 5 receives the transmitted image data via the network, and starts the reference image data creation program 21 in response to the reception. The computer 5 executes the reference image data creation program 21 which was started so as to create reference image data. The reference image data is created by arranging images transmitted from the first image pickup devices 2-1 through 2-6 that were converted into the low resolution and integrating the images into one image to be displayable in the image display device 4.

The computer 5 also creates face posture data on the basis of the face image data transmitted from the face image pickup device 3. The face image data to be created is created by executing the face posture data creation program 22. The computer 5 determines a position of the face front point P (point on the screen positioned in front of the face) by using the face posture data detected by the face posture data creation program 22 and position information on the display of the screen device data 11 so as to output as the face front point P. Furthermore, the resolution of an image from the monitoring camera displayed in a region including the face front point P is increased while decreasing the resolution of images from other monitoring cameras, so that display image data is created.

The operation described above will be explained concretely. The first image pickup device 2-1 through the sixth image pickup device 2-6 composing the wide area monitoring system pick up the image data G1 through the image data G6 of different spots. Each of the picked-up image data (G1 through G6) is transmitted to the computer 5 via the network. It is assumed here that each of the transmitted image data has 360×240 pixels while the pixel size displayable in the image display device 4 is 360×240 pixels.

The computer 5 executes the reference image data creation program 21, and distributes the images picked up by the first image pickup device 2-1 through the sixth image pickup device 2-6 to five regions of 120×80 pixels (region 42 through region 46) and one region of 240×160 pixels (region 41) having about double resolution thereof, as shown in a display image 40c in FIG. 9. At the time of starting the operation of the system (initial state), the computer 5 displays the images in the image display device 4 by allocating the region 41 to a region of 240×160 pixels and the region 42 through the region 46 to regions of 120×80 pixels, as shown in the display image 40c.

During the operation of the system, the computer 5 continues to pick up a face image of the observer 10 using the face image pickup device 3. The computer 5 executes the face posture data creation program 22 to detect a three-dimensional position and direction of the face of the observer 10 on the basis of the face image data transmitted from the face image pickup device 3. The computer 5 further determines the face front point P (a crossing point made between the straight line extended to the face direction from a position of the face and the screen of the image display device 4) as the face front point P by using face posture data calculated by executing the face posture data creation program 22, the display device data 11 and the face image pickup device data 12.

The computer 5 determines here a region where the face front point P is included among the region 41 through the region 46, so as to create new display image data for causing a region including the face front point P to become a region of 240×160 pixels. At the time other than starting the system, a region which includes the face front point P is distinguished on the basis of the display image data used for the previous display. For example, if the face front point P is positioned within a region of the region 46, the computer 5 creates display image data by assuming the region 46 as a region of 240×160 pixels at the bottom right, as shown in a display image 40d. In the display image data, the region 41 through the region 45 are made to be regions of 120×80 pixels. That is, as an image to be monitored which is displayed in the image display device 4, display image data is displayed by converting the image data G1 through the image data G6 into the resolutions of the region 41 through the region 46 respectively.

Although the magnification amount of the resolution is made to be double and constant in the above example, it can be arbitrarily changed by changing the setting of the layout data 14. In particular, it is also possible for a viewer to change the variation amount of the resolution according to the necessity by executing processing that the resolution is changed to be high when the face is getting close to the display and it is changed to be low when the face is getting far.

The present invention is thus applied to the wide area monitoring system so that a guard is capable of constantly monitoring a plurality of spots at once, and an image showing a spot in which an abnormal event is suspected can be enlarged and displayed in such a manner to follow the sight line. According to the present invention, the observer 10 is capable of displaying an objective region in the high resolution for confirmation simply by the slight movement of the face without conducting a switch operation or the like, thereby prompt handling can be achieved in the case of an abnormal event. The present invention also enables wide area monitoring for the observer 10 without mounting the special device.

The invention claimed is:

1. An image display system which increases an amount of information provided from a region of a display image based on an image of a face of a person who will look at the display image comprising:

an image display device which displays the display image;

a face image pickup device which picks up the image of the face of the person who will look at the display image; and a face front point detecting device which detects a face front point, which is a point on the image display device at which the person's face is pointing, using an image recognition technique based on the image of the face picked up by the face image pickup device, wherein an increased amount of information is displayed for a region of the display image corresponding to the face front point, said region being controlled based on the face front point, wherein data for the display image comes from a wide range image pickup device which picks up a wide range image which exceeds a range of human visibility, wherein said image display device displays the wide range image so as to be in a range of said human visibility, and wherein the amount of information is increased by relatively increasing a display size of the region of the display image corresponding to the face front point.

2. The image display system according to claim 1, wherein:

said face front point detecting device detects a new face front point, and wherein an increased amount of information is displayed for a region of the display image corresponding to the new face front point.

3. The image display system according to claim 1, wherein the amount of information is increased by relatively increasing a resolution of the region of the display image corresponding to the face front point.

4. The image display system according to claim 1, wherein:
said wide range image pickup device comprises a plurality of image pickup devices,
a plurality of images are picked up by said plurality of image pickup devices of said wide range image pickup device and are composited into said display image, and
said image display device displays said display image in a range of said human visibility.

5. The image display system according to claim 1, wherein said image creating device includes:
an information storage unit,
wherein said information storage unit stores display device data which includes information on said image display device and face image pickup device data which includes information on the face image pickup device, and
wherein said face front point detecting device creates face image data by executing three-dimensional image processing on the basis of the image of the face, and detects said face front point on the basis of said face image data, said display device data, and said face image pickup device data.

6. An image display method which increases an amount of information provided from a region of a display image based on an image of a face of a person who will look at the display image comprising:
(a) displaying a display image with an image display device;
(b) picking up the image of the face of the person who will look at said display image;
(c) detecting a face front point, which is a point on the image display device at which the person's face is pointing, using an image recognition technique on the basis of the image of the face of the person; and
(d) increasing an amount of information displayed for a region of the display image corresponding to the face front point, said region being controlled based on the face front point,
wherein said step (a) includes:
(a1) obtaining data for the display image from a wide range image pickup device which picks up a wide range image which exceeds a range of human visibility,
wherein said step (d) includes:
(d1) displaying said wide range image so as to be in a range of said human visibility, and
wherein the amount of information is increased by relatively increasing a display size of the region of the display image corresponding to the face front point.

7. The image display method according to claim 6, further comprising:
(e) detecting a new face front point; and
(f) increasing an amount of information displayed for a region of the display image corresponding to the new face front point.

8. The image display method according to claim 6, wherein the amount of information is increased by relatively increasing a resolution of the region of said display image corresponding to the face front point.

9. The image display method according to claim 6, wherein:
said wide range image pickup device comprises a plurality of image pickup devices, and
said step (a1) includes:
(a11) compositing a plurality of images picked up by the plurality of image pickup devices of said wide range image pickup device into said display image,
wherein said step (d1) includes:
(d11) displaying said display image in a range of said human visibility.

10. The image display method according to claim 6, wherein said step (c) includes:
(c1) reading display device data which includes information on said image display device and face image pickup device data which includes information on a face image pickup device which picks up said image of the face, and
(c2) creating face image data by executing three-dimensional image processing on the basis of said image of the face, and detecting said face front point on the basis of said face image data, said display device data, and said face image pickup device data.

11. A computer-readable medium comprising code that, when executed, causes a computer to execute a method which increases an amount of information provided from a region of a display image based on an image of a face of a person who will look at the display image comprising:
(h) displaying a display image with an image display device;
(i) detecting a face front point, which is a point on the image display device at which the person's face is pointing, using an image recognition technique on the basis of said image of the face;
(l) increasing an amount of information displayed for a region of the display image corresponding to the face front point, said region being controlled based on the face front point,
wherein said step (h) includes:
(h1) obtaining data for the display image from a wide range image pickup device which picks up a wide range image which exceeds a range of human visibility,
wherein said step (j) includes:
(j1) displaying said wide range image so as to be in a range of said human visibility, and
wherein the amount of information is increased by relatively increasing a display size of the region of the display image corresponding to the face front point.

12. The computer-readable medium according to claim 11, further comprising:
(k) detecting a new face front point; and
(l) increasing an amount of information displayed for a region of the display image corresponding to the new face front point.

13. The computer-readable medium according to claim 11, wherein the amount of information is increased by relatively increasing a resolution of the region of said display image corresponding to the face front point.

14. The computer-readable medium according to claim 11, wherein:
said wide range image pickup device comprises a plurality of image pickup devices, and
said step (h1) includes:
(h11) compositing a plurality of images picked up by the plurality of image pickup devices of said wide range image pickup device into said display image,
wherein said step (j1) includes:
(j11) displaying said display image in a range of said human visibility.

15. The computer-readable medium according to claims 11, wherein said step (i) includes:
(i1) reading display device data which includes information on said image display device and face image pickup device data which includes information on a face image pickup device which picks up said image of the face, and (i2) creating face image data by executing three-dimensional image processing on the basis of said image of the face, and detecting said face front point on the basis of said face image data, said display device data, and said face image pickup device data.

16. An image display system comprising:

an image display device;

an image creating device which creates display image data of a display image displayed in said image display device, wherein said display image has a plurality of regions;

a face image pickup device which picks up a face image of a person to look at the display image; and a face front point detecting device which creates face image data from said face image, and detects a face front point as a point on said display image at which the person's face is pointing using an image recognition technique on the basis of said face image data, wherein said image creating device specifies a specific region corresponding to said face front point from said plurality of said regions, said specific region being controlled based on the face front point, creates said display image data by increasing an amount of information provided from an image corresponding to said specific region, and includes:

an information storage unit, wherein said information storage unit stores display device data indicating information on said image display device and face image pickup device data indicating information on the face image pickup device, wherein said face front point detecting device creates face image data by executing three-dimensional image processing on the basis of the face image, and detects said face front point on the basis of said face image data, said display device data and said face image pickup device data, wherein said image creating device composes said display image with a wide range image picked up by a wide range image pickup device which picks up an image in a range exceeding a range of the human visibility, wherein said image display device displays said image data composed of said wide range images to be in a range of said human visibility corresponding to said plurality of regions, and wherein said image creating device increases said amount of information provided from said image by relatively increasing a display size of said image displayed in said image display device.

17. The image display system according to claim 16, wherein said face front point detecting device detects a new face front point, and said image creating device creates new display image data by specifying a new region and increasing the amount of information provided from an image corresponding to said new region, when said new face front point is transited from said specific region.

18. The image display system according to claim 16, wherein said image creating device increases said amount of information provided from said image by relatively increasing a resolution of said image displayed in said image display device.

19. The image display system according to claim 16, wherein said image creating device composites a plurality of images picked up by a plurality of image pickup devices as said wide range image pickup device into said display image, and said image display device displays said display image data corresponding to said plurality of regions to be in a range of said human visibility.

20. An image display method comprising:

(a) creating display image data of a display image displayed in an image display device, wherein the display image has a plurality of regions;

(b) picking up a face image of a person looking at said display image;

(c) creating face image data from said face image, and detecting a point on said display image at which the person's face is pointing using an image recognition technique on the basis of said face image data as a face front point of said person;

(d) specifying a specific region corresponding to said face front point from said plurality of regions, said specific region being controlled based on the face front point, and creating display image data by increasing an amount of information provided from an image corresponding to said specific region; and (e) displaying said display image data in said image display device, wherein said step (c) includes:

(c1) reading display device data indicating information on said image display device and face image pickup device data indicating information on a face image pickup device which picks up said face image, and (c2) creating face image data by executing three-dimensional image processing on the basis of said face image, and detecting said face front point on the basis of said face image data, said display device data and said face image pickup device data, wherein said step (a) includes:

(a1) composing said display image with a wide range image picked up by a wide range image pickup device which picks up an image in a range exceeding a range of the human visibility, wherein said step (e) includes:

(e1) displaying said display image data composed of said wide range images to be in a range of said human visibility corresponding to said plurality of the regions, and wherein said increase of said amount of information provided from said image is realized by relatively increasing a display size of said image displayed in said image display device.

21. The image display method according to claim 20, further comprising:

(f) detecting a new face front point; and (g) creating new display image data by specifying a new specific region and increasing said amount of information provided from an image corresponding to said new specific region when said new face front point is transited from said specific region.

22. The image display method according to claim 20, wherein said increase of said amount of information provided from said image is realized by relatively increasing a resolution of sand image displayed in said image display device.

23. The image display method according to claim 20, wherein said step (a1) includes:

(a11) compositing a plurality of images picked up by a plurality of image pickup devices as said wide range image pickup device into said display image, each of said plurality of regions corresponds to each of said plurality of images, wherein said step (e1) includes:
(e11) displaying said display image data to be in a range of said human visibility corresponding to said plurality of regions.

24. A computer-readable medium comprising code that, when executed, causes a computer to execute a method comprising:
(h) creating display image data of a display image displayed in an image display device, wherein said display image includes a plurality of regions;
(i) creating face image data from a face image of a person to look at said display image, and detecting a point on said display image at which the person's face is pointing as a face front point of said person using an image recognition technique on the basis of said face image data;
(j) specifying a specific region corresponding to said face front point from said plurality of regions, said specific region being controlled based on the face front point, and creating display image data by increasing an amount of information provided from an image corresponding to said specific region; and
(k) outputting said display image data to said image display device,
wherein said step (i) includes:
(i1) reading display device data indicating information on said image display device and face image pickup device data indicating information on a face image pickup device which picks up said face image, and
(i2) creating face image data by executing three-dimensional image processing on the basis of said face image, and detecting said face front point on the basis of said face image data, said display device data and said face image pickup device data,
wherein said step (h) includes:
(h1) composing said display image with a wide range image picked up by a wide range image pickup device which picks up an image in a range exceeding a range of a human visibility,
wherein said step (k) includes:
(k1) outputting said display image data to said image display device such that said display image data composed of said wide range image is displayed to be in a range of said human visibility corresponding to said plurality of regions, and
wherein an increase of said amount of information provided from said image is realized by relatively increasing of a display size of said image displayed in said image display device.

25. The computer-readable medium according to claim 24, further comprising:
(l) detecting a new face front point; and
(m) creating new display image data by specifying a new specific region and increasing an amount of information provided from an image corresponding to said new specific region when said new face front point is transited from said specific region.

26. The computer-readable medium according to claim 24, wherein an increase of said amount of information provided from said image is realized by relatively increasing a resolution of said image displayed in said image display device.

27. The computer-readable medium according to claim 24, wherein said step (h1) includes:
(h11) compositing a plurality of images picked up by a plurality of image pickup devices as said wide range image pickup device into said display image, each of said plurality of regions corresponds to each of said plurality of images,
wherein said step (k1) includes:
(k11) outputting said display image data to said image display device such that said display image data is displayed to be in a range of said human visibility corresponding to said plurality of regions.

28. An image display system comprising:
an image display device;
an image creating device which creates display image data of a display image displayed in said image display device, wherein said display image has a plurality of regions;
a face image pickup device which picks up a face image of a person to look at the display image; and
a face front point detecting device which calculates a face posture from said face image, and detects a face front point as a point on said display image at which the person's face is pointing using an image recognition technique on the basis of said face image data,
wherein said image creating device specifies a specific region corresponding to said face front point from said plurality of said regions, said specific region being controlled based on the face front point, and creates said display image data by increasing an amount of information provided from an image corresponding to said specific region,
wherein said image creating device composes said display image with a wide range image picked up by a wide range image pickup device which picks up an image in a range exceeding a range of the human visibility,
wherein said image display device displays said image data composed of said wide range images to be in a range of said human visibility corresponding to said plurality of regions, and
wherein said image creating device increases said amount of information provided from said image by relatively increasing a display size of said image displayed in said image display device.

29. The image display system according to claim 28, wherein said image creating device includes:
an information storage unit,
wherein said information storage unit stores display device data indicating information on said image display device and face image pickup device data indicating information on the face image pickup device, and
wherein said face front point detecting device creates face image data by executing three-dimensional image processing on the basis of the face image, and detects said face front point on the basis of said face image data, said display device data and said face image pickup device data.

30. An image display method comprising:
(a) creating display image data of a display image displayed in an image display device, wherein the display image has a plurality of regions;
(b) picking up a face image of a person looking at said display image;
(c) calculating a face posture from said face image, and detecting a point on said display image at which the person's face is pointing using an image recognition technique on the basis of said face posture as a face front point of said person;
(d) specifying a specific region corresponding to said face front point from said plurality of regions, said specific region being controlled based on the face front point, and creating display image data by increasing an amount of information provided from an image corresponding to said specific region; and
(e) displaying said display image data in said image display device, wherein said step (a) includes:
(a1) composing said display image with a wide range image picked up by a wide range image pickup device which picks up an image in a range exceeding a range of the human visibility, wherein said step (e) includes:
(e1) displaying said display image data composed of said wide range images to be in a range of said human visibility corresponding to said plurality of the regions, and wherein said increase of said amount of information provided from said image is realized by relatively increasing a display size of said image displayed in said image display device.

31. The image display method according to claim 30, wherein said step (c) includes:
(c1) reading display device data indicating information on said image display device and face image pickup device data indicating information on a face image pickup device which picks up said face image, and
(c2) calculating said face posture by executing three-dimensional image processing on the basis of said face image, and detecting said face front point on the basis of said face posture, said display device data and said face image pickup device data.

32. A computer-readable medium comprising code that, when executed, causes a computer to perform the following:
(a) creating display image data of a display image displayed in an image display device, wherein said display image includes a plurality of regions;
(b) calculating a face posture from a face image of a person to look at said display image, and detecting a point on said display image at which the person's face is pointing as a face front point of said person using an image recognition technique on the basis of said face posture;
(c) specifying a specific region corresponding to said face front point from said plurality of regions, said specific region being controlled based on the face front point, and creating display image data by increasing an amount of information provided from an image corresponding to said specific region; and
(d) outputting said display image data to said image display device, wherein said step (a) includes:
(a1) composing said display image with a wide range image picked up by a wide range image pickup device which picks up an image in a range exceeding a range of a human visibility, wherein said step (d) includes:
(d1) outputting said display image data to said image display device such that said display image data composed of said wide range image is displayed to be in a range of said human visibility corresponding to said plurality of regions, and wherein an increase of said amount of information provided from said image is realized by relatively increasing of a display size of said image displayed in said image display device.

33. The computer-readable medium according to claim 32, wherein said step (b) includes:
(b1) reading display device data indicating information on said image display device and face image pickup device data indicating information on a face image pickup device which picks up said face image, and
(b2) calculating said face posture by executing three-dimensional image processing on the basis of said face image, and detecting said face front point on the basis of said face posture, said display device data and said face image pickup device data.

* * * * *